Figure 9:
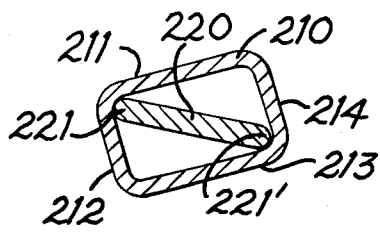

United States Patent [19]

Pommier

[11] 4,237,954
[45] Dec. 9, 1980

[54] TIRE WITH TUBULAR BEAD RINGS

[75] Inventor: Jean Pommier, Clermont-Ferrand, France

[73] Assignee: Compagnie Generale des Etablissements Michelin, Clermont-Ferrand, France

[21] Appl. No.: 964

[22] Filed: Jan. 3, 1979

Related U.S. Application Data

[63] Continuation-in-part of Ser. No. 904,295, May 9, 1978, abandoned.

[30] Foreign Application Priority Data

May 9, 1977 [FR] France ................................ 77 14329
Nov. 2, 1978 [FR] France ................................ 78 31291

[51] Int. Cl.³ .......................................... B60C 15/04
[52] U.S. Cl. .............................................. 152/362 R
[58] Field of Search ..................... 152/362 R, 362 CS; 156/136; D12/152

[56] References Cited

U.S. PATENT DOCUMENTS

| | | | |
|---|---|---|---|
| 1,003,314 | 9/1911 | Anthony | 152/362 R |
| 1,158,194 | 10/1915 | Fink et al. | 152/362 |
| 3,741,507 | 6/1973 | Hahn | 152/362 R |

FOREIGN PATENT DOCUMENTS

| | | | |
|---|---|---|---|
| 557915 | 6/1957 | Belgium | 152/362 R |
| 2360731 | 6/1975 | Fed. Rep. of Germany | 152/362 R |
| 2603325 | 8/1976 | Fed. Rep. of Germany | 152/362 R |
| 1255078 | 1/1961 | France | 152/362 R |

*Primary Examiner*—Michael W. Ball
*Attorney, Agent, or Firm*—Brumbaugh, Graves Donohue & Graves

[57] ABSTRACT

Tire having a carcass reinforcement anchored to at least one bead ring, the bead ring consisting of a hollow metallic member, is improved due to the fact that the bead ring as seen in radial cross-section is essentially formed of four sides which converge in pairs and of an interior reinforcement connecting the two regions where two consecutive converging sides meet, and due to the fact that the bead ring is arranged in the bead in such a manner that the interior reinforcement forms an angle of less than ±60° with the bisector of the angle formed by the bead seat on the rim with the tangent to the rim flange adjacent to said bead seat, the bisector being directed towards the inside of the tire, the latter being mounted and inflated.

20 Claims, 14 Drawing Figures

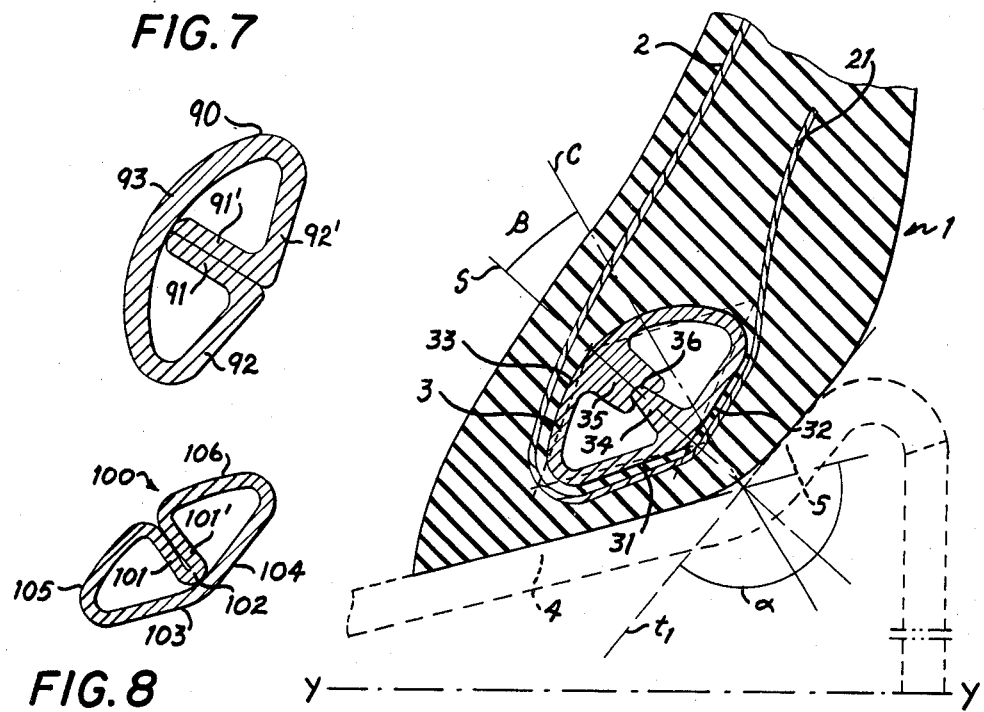
FIG. 1
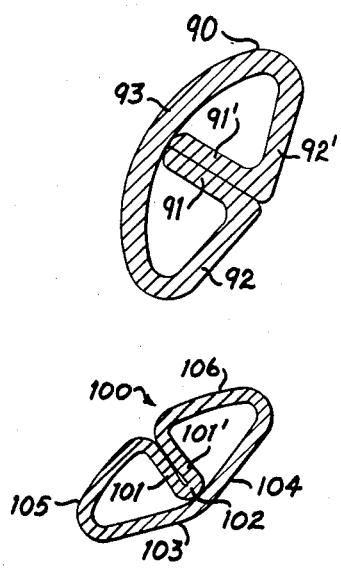
FIG. 7
FIG. 8
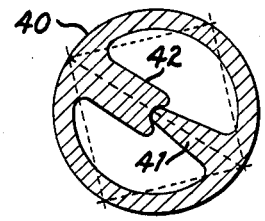
FIG. 2
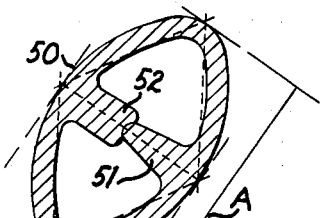
FIG. 3
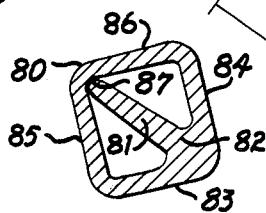
FIG. 6
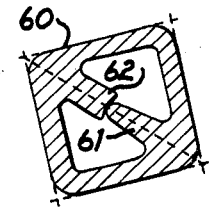
FIG. 4
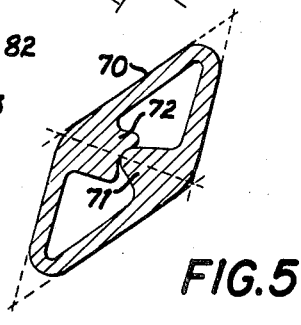
FIG. 5

TIRE WITH TUBULAR BEAD RINGS

This application is a continuation-in-part application of U.S. application Ser. No. 904,295, filed May 9, 1978 (now abandoned)

The present invention relates to improvements in pneumatic tires and more particularly in the beads of pneumatic tires of very large size which are intended for use in heavy equipment, such as those used for civil engineering work.

At the present time, tires of the type in question are in most cases mounted without an inner tube on rims having frustoconical bead seats. Thus, the bead must fulfill two essential roles, namely:

assure the seal between the tire and the rim, and secure the tire to the rim, whatever the value of the tangential driving force to be transmitted.

Bead rings which serve as reinforcement of the beads contribute preponderantly to the carrying out of these two functions, but at the price of an excessive amount of material (steel wire or ribbon).

Furthermore, the fatigue strength of the elements forming the bead seems to be related to the value of the radial cross-section selected for the bead rings.

Finally, the shape of the radial cross-section of the ordinary bead rings formed of steel wires or ribbons causes, on the rim, a distribution of the pressures of the bead which is unfavorable, due to the coexistence of zones of excessively high local pressures and zones of excessively low local pressures. As a result, the beads become worn and/or slide circumferentially with respect to the rim.

The bead rings used in the beads of tires of the type in question therefore have an excessive radial cross-section as compared with that required, for instance, for static resistance.

In order to lighten the weight of the bead rings it has already been proposed to use a hollow member, for example, of metal, the cavity of which is filled with a ring of plastic material, or a hollow member of extruded plastic material. However, such hollow bead rings would not be suitable for tires of the type in question, due in particular to the fact that their resistance to rupture and crushing is insufficient.

The problem at which the invention is directed is therefore to create a hollow metallic bead ring, the weight of which is low for a relatively high overall radial cross-section, but which is nevertheless resistant to rupture and crushing and the shape of the radial cross-section of which causes as uniform as possible a distribution of the bead pressures on the rim.

Accordingly, the pneumatic tire in accordance with the present invention, having a carcass reinforcement anchored to at least one bead ring, the bead ring consisting of a hollow metallic member, is characterized by the fact that the bead ring, as seen in radial cross-section, is essentially formed of four sides which converge in pairs and of an interior reinforcement connecting the two regions where two consecutive converging sides meet, and by the fact that the bead ring is arranged in the bead in such a manner that the interior reinforcement forms an angle of less than ±60° with the bisector of the angle formed by the bead seat on the rim with the tangent to the rim flange adjacent to said bead seat, the bisector being directed towards the inside of the tire, the latter being mounted and inflated.

By interior reinforcement, there is understood not only the reinforcement itself or its axis of symmetry in the case of a linear reinforcement or of a reinforcement with linear axis of symmetry, but also the chord connecting the two ends of the reinforcement in the event that the reinforcement is curved.

Thus, by means of the invention, the radial cross-section of the bead ring is, by triangulation, made nondeformable, particularly with respect to the forces coming from the rim and the carcass reinforcement and tending to crush the radial cross-section of the bead ring.

The radial cross-section of a bead ring in accordance with the invention preferably is essentially formed of two sides of little or no curvature facing the rim and two other curved sides.

At the limit, the radial cross-section of the bead ring in accordance with the invention may be circular or approximately elliptical with its minor axis substantially parallel to the interior reinforcement or contained within the interior reinforcement, or else in the shape of a square or parallelogram with rounded corners, the small diagonal of the parallelogram being substantially parallel to the interior reinforcement or contained within it.

It is advantageous to arrange the interior reinforcement of the bead ring of the invention along the bisector of the angle formed by the converging sides facing the rim or by the chords subtending the converging sides, or in such a manner that the interior reinforcement has such bisector as the axis of symmetry.

The converging sides of the radial cross-section of the bead ring which face the rim or the chords subtending said sides can form an angle substantially equal to the angle formed by the bead seat on the rim with the tangent to the rim flange adjacent to said bead seat.

The bead ring in accordance with the invention can also be arranged in the bead in such a manner that the interior reinforcement or its axis of symmetry is parallel to the bisector of the angle formed by the bead seat on the rim with the tangent to the rim flange adjacent to said bead seat, or that this interior reinforcement contains such bisector or has such bisector as the axis of symmetry.

Such bead rings are well-suited for tires whose carcass reinforcement is essentially formed of radial metal cables and which are intended for heavy and very heavy vehicles.

The interior reinforcement can be formed of a first rib coming from the region surrounding the point of convergence of two consecutive sides and of a second rib, wider than the first rib, opposite the latter and provided at its free end with a groove against which the free end of the first rib bears. Alternatively, the interior reinforcement can consist of a single part whose root is located in the region where two converging sides meet, while the opposite end is located in the region where two opposite converging sides meet.

The hollow metallic member can have two adjoining converging sides while the interior reinforcement can be composed of two adjoining sections which are extensions of said sides.

In the above-described embodiments of the invention, the interior reinforcement is integral with at least one of the two regions where two consecutive sides of the hollow metallic member or bead ring meet. However, in other embodiments of the present invention, the interior reinforcement is formed at least in part by a metallic element which is physically independent of the hollow metallic member and forms between said two regions a rigid brace having two longitudinal edges each arranged in one of said regions. In order to constitute this interior reinforcement, there is used, for instance, a flat metal part having a rectangular cross-section.

By means of the bead ring of the invention, the pressure on the rim of the portion of the bead in which the bead ring is placed is made uniform. Furthermore, the radial cross-section of the bead ring can be given a shape and area which are suitable for assuring sufficient fatigue strength for the elements forming the bead and for assuring the bead ring itself suitable resistance to stresses which tend to deform it.

Figure 10:
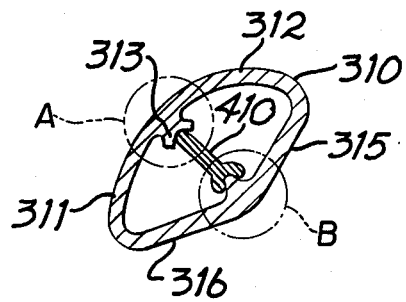
Figure 10A:
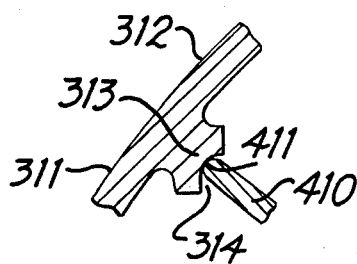
Figure 10B:
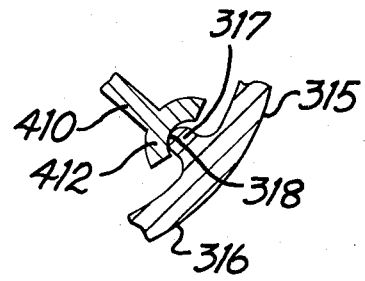
Figure 11:
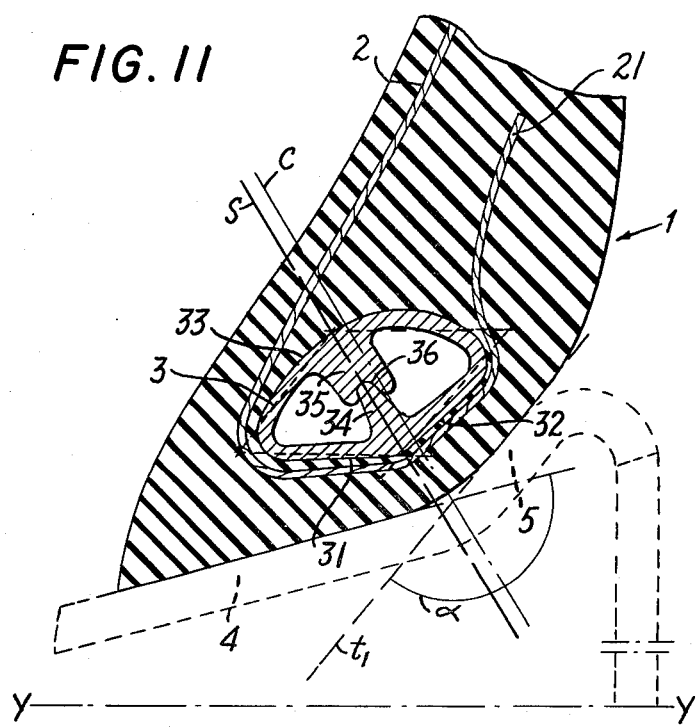
Figure 12:
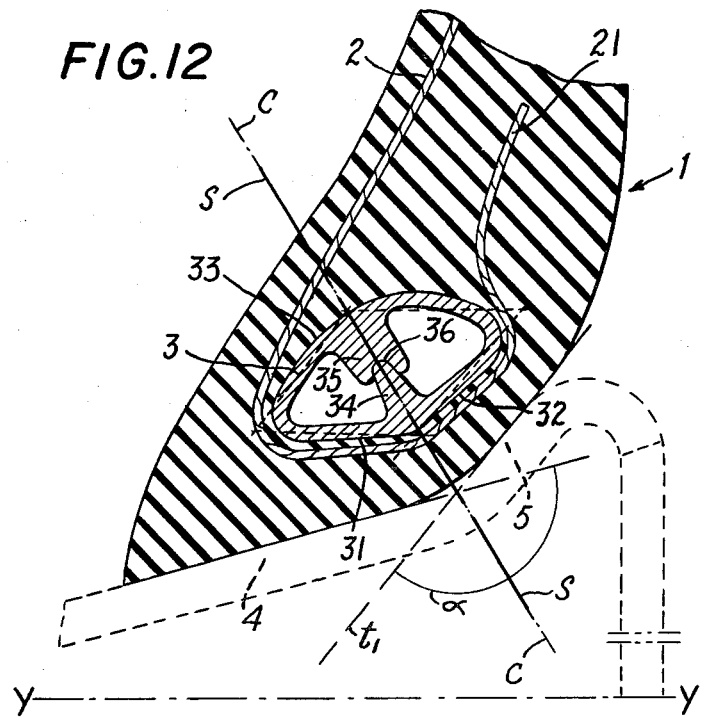

The portion of the description which follows describes embodiments of the invention, this description being given with reference to the drawing, in which:

FIGS. 1, 11 and 12 each show, in radial cross-section, a bead ring in accordance with the invention arranged in a bead of a radial tire mounted on its rim, said rim being shown in dashed line and only in part, FIGS. 2 to 10 show other radial cross-sections of bead rings in accordance with the invention, and FIGS. 10A and 10B are views on a larger scale of the parts of FIG. 10 contained within the circles A and B, respectively.

FIG. 1 shows a bead 1 of a tire with a radial carcass reinforcement 2. The preferably metal carcass reinforcement 2 surrounds the bead ring 3 and its turned-up portion 21 rises to above the bead ring 3. The bead 1 is arranged on a rim of which the drawing shows only the portion forming a bead seat 4 and a rim flange 5 intended to come into contact with the bead 1. In the example selected, this bead seat 4 is inclined with respect to the axis of rotation of the rim, indicated by the straight line YY. The bead seat 4 and the tangent $t_1$ to the adjacent rim flange 5 form an angle $\alpha$.

The bead ring 3 in accordance with the invention has a radial cross-section which is essentially formed of two converging sides 31 and 32 which form with each other an angle which is substantially equal to the angle $\alpha$, and of a circular arc 33 connecting the noncommon ends of the converging sides 31 and 32. On its inside, the bead ring 3 has an interior reinforcement which is symmetrical with respect to the bisector S of the angle formed by the two converging sides 31 and 32. This interior reinforcement is formed of a first rib 34 coming from the region surrounding the point of convergence of the two consecutive sides 31 and 32, and of a second rib 35, wider than the first rib 34, coming from the circular arc 33 and provided at its free end with a groove 36. The free end of the first rib 34 fits within or bears against the groove 36 at the free end of the second rib 35. The interior reinforcement 34, 35 opposes deformation, particularly by crushing, of the hollow member in accordance with the invention by dividing the radial cross-section of the bead ring into two triangles (shown in dashed line) of which the interior reinforcement forms a common side.

The axis of symmetry S and, therefore, the reinforcement 34, 35 itself form an angle $\beta$ of about 17°–20° with respect to the bisector C of the angle $\alpha$ formed by the bead seat 4 on the rim with the tangent $t_1$ to the rim flange 5. Alternatively, as shown in FIGS. 11 and 12, the axis of symmetry S can be parallel to the bisector C of the angle $\alpha$ (FIG. 11) or the axis of symmetry S can lie along the bisector C of the angle $\alpha$ (FIG. 12).

The two sides 31 and 32 are quasi-linear and therefore of practically zero curvature and face the bead seat 4 and rim flange 5 of the rim. The angle formed by these two sides 31 and 32 is substantially equal to the angle $\alpha$ formed by the bead seat 4 with the tangent $t_1$ to the rim flange 5. The circular arc 33 forms the other two sides of the radial cross-section, which are thus located in the extension of each other.

FIG. 2 shows a bead ring 40 whose radial cross-section is circular on the outside. In accordance with the invention, the diametrical interior reinforcement consisting of a first rib 41 and a wider second rib 42 divides this radial cross-section into two triangles (shown in dashed line) of which said interior reinforcement 41, 42 constitutes the common side. The free end of the first rib 41 bears against a groove at the free end of the second rib 42.

FIG. 3 shows a bead ring 50 whose radial cross-section has an approximately oval or elliptical shape. In accordance with the invention, the bipartite interior reinforcement formed of a first rib 51 and a wider second rib 52 divides this ellipse into two triangles (shown in dashed line), of which said interior reinforcement 51, 52 constitutes the common side. The free end of the first rib 51 bears against a groove at the free end of the second rib 52. The dimension A of the radial cross-section of the bead ring 50, measured parallel to the interior reinforcement 51, 52, is—as furthermore in the case of FIGS. 1, 5, 7 and 8—larger than its dimension B, measured perpendicular to said interior reinforcement. In this case, this side which is common to the two triangles merges with the minor axis of the elliptical cross-section of the bead ring.

FIG. 4 shows a bead ring 60 of square shape with rounded corners. The bipartite interior reinforcement consisting of a first rib 61 and a wider second rib 62 forms one of the diagonals of the square. This diagonal merges with the side common to the two triangles (shown in dashed line) into which the contour of this bead ring can be subdivided. The free end of the first rib 61 bears against a groove at the free end of the second rib 62.

FIG. 5 shows a bead ring 70 having an outer section in the form of a parallelogram with rounded corners. The bipartite interior reinforcement formed of a first rib 71 and a wider second rib 72 contains the smallest diagonal of the parallelogram. This diagonal represents the side common to the two trianges (shown in dashed line), into which the contour of said bead ring can be subdivided. The free end of the first rib 71 bears against a groove at the free end of the second rib 72.

The interior reinforcement 81 of the bead ring 80 of square radial cross-section shown in FIG. 6 differs from the interior reinforcements described above by the fact that it consists of a single part 81 whose root 82 is located in the region where the two converging sides 83 and 84 meet, while the opposite end 87 is located in the region where the two opposite converging sides 85, 86 meet.

The bead ring 90 illustrated in FIG. 7 is distinguished from all the preceding bead rings by the fact that two of its converging sides, in this case the sides 92, 92', are joined together and no longer formed of a single piece. Likewise, its interior reinforcement is composed of two adjoining sections 91, 91' which are the extensions of the adjoining converging sides 92, 92', respectively.

The bead ring 100 of FIG. 8 has an interior reinforcement composed of two adjoining sections 101, 101' which are connected to each other at their common apex 102 and which are extensions of the adjoining converging sides 105 and 106. Its two sides 103, 104 have a zero curvature, while the opposite adjoining converging sides 105, 106 are curved.

In the embodiment shown in FIG. 9, a quadrilateral hollow metallic member 210 which constitutes the bead ring is reinforced by a physically independent metallic element 220, preferably a profiled member of rectangular cross-section whose sides 221 and 221', which constitute the longitudinal edges, thereof are rounded. The side 221 is located in the reentrant angle which forms the region of connection of two converging sides 211, 212 of the hollow metallic member 210, while the side 221' of the interior reinforcement element 220 is located in the other reentrant angle, diagonally opposite the first, which forms the region of connection of the other two converging sides 213, 214 of the hollow metallic member 210. In the circumferential direction, the interior reinforcement element 220 may form a closed or open ring.

In the embodiment shown in FIGS. 10, 10A and 10B, the hollow metallic member 310 which constitutes the bead ring has two convex converging sides 311 and 312 and two substantially linear converging sides 315 and 316. In the region of connection of the two convex sides 311 and 312 there is an internal protuberance 313 integral with the hollow metallic member 310 and the free end of which forms a groove 314. In the region of connection of two substantially linear sides 315 and 316 there is another internal protuberance 317 whose free end 318 is rounded. The physically independent interior reinforcement 410 of the hollow metallic member 310 is interposed between the internal protuberances 313 and 317. On the side of the protuberance 313, this interior reinforcement 410 is engaged by its rounded side 411 in the groove 314 of said protuberance. On the opposite side, the interior reinforcement 410 forms a fork 412 which is arranged over the rounded side 318 of the protuberance 317.

In another embodiment (not shown), the two sides of the interior reinforcement 410 are designed either like the side 411, in which case the hollow metallic member 310 has two internal protuberances such as 313, or like the fork 412, in which case the two internal protuberances of the hollow metallic member 310 are like the protuberance 317.

It goes without saying that the principle of the invention can be extended to hollow bead rings having a plurality of juxtaposed cavities of triangular radial cross-section, with a single side in common from one cavity to the next.

What is claimed is:

1. A tire having a carcass reinforcement anchored to at least one hollow metallic bead ring having an interior reinforcement, characterized by the fact that
   (a) the hollow metallic bead ring, as seen in radial cross-section, is essentially formed of four sides which converge in pairs and the interior reinforcement connects the two regions where two consecutive converging sides meet;
   (b) the interior reinforcement is formed of a first rib coming from the region surrounding the point of convergence of two consecutive sides and of a second rib opposite the first rib and provided at its free end with a groove against which the free end of the first rib bears;
   (c) the hollow metallic bead ring is arranged in the bead in such a manner that the interior reinforcement is parallel to the bisector of the angle formed by the bead seat on the rim with the tangent to the rim flange adjacent to said bead seat, the bisector being directed towards the inside of the tire; and
   (d) the tire being mounted and inflated.

2. The tire according to claim 1, characterized by the fact that the radial cross-section of the hollow metallic bead ring is essentially formed of two sides of little or no curvature facing the rim and of two other curved sides which may be located in the extension of each other.

3. The tire according to claim 1, characterized by the fact that the radial cross-section of the hollow metallic bead ring has the shape of a circle.

4. The tire according to claim 1, characterized by the fact that the radial cross-section of the hollow metallic bead ring has the shape of a square with rounded corners.

5. The tire according to claim 1, characterized by the fact that the radial cross-section of the hollow metallic bead ring has approximately the shape of an ellipse whose minor axis is substantially parallel to the interior reinforcement.

6. The tire according to claim 1, characterized by the fact that the radial cross-section of the hollow metallic bead ring has the shape of a parallelogram with rounded corners, the samll diagonal of which is substantially parallel to the interior reinforcement.

7. The tire according to claim 1, characterized by the fact that the interior reinforcement is arranged along the bisector of the angle formed by the converging sides facing the rim.

8. The tire according to claim 1, characterized by the fact that the converging sides of the radial cross-section of the hollow metallic bead ring which face the rim form an angle substantially equal to the angle formed by the bead seat on the rim with the tangent to the rim flange adjacent to said bead seat.

9. The tire according to claim 1, characterized by the fact that it comprises a carcass reinforcement of radial type, preferably of metal.

10. The tire according to claim 1, characterized by the fact that the second rib is wider than the first rib.

11. A tire having a carcass reinforcement anchored to at least one hollow metallic bead ring having an interior reinforcement, characterized by the fact that
   (a) the hollow metallic bead ring, as seen in radial cross-section, is essentially formed of four sides which converge in pairs and the interior reinforcement connects the two regions where two consecutive converging sides meet;
   (b) the interior reinforcement is formed of a first rib coming from the region surrounding the point of convergence of two consecutive sides and of a second rib opposite the first rib and provided at its free end with a groove against which the free end of the first rib bears;
   (c) the hollow metallic bead ring is arranged in the bead in such a manner that the interior reinforcement is in the direction of and contains the bisector of the angle formed by the bead seat on the rim with the tangent to the rim flange adjacent to said bead seat, the bisector being directed towards the inside of the tire; and
   (d) the tire being mounted and inflated.

12. The tire according to claim 1, characterized by the fact that the radial cross-section of the hollow metallic bead ring is essentially formed of two sides of little or no curvature facing the rim and of two other curved sides which may be located in the extension of each other.

13. The tire according to claim 1, characterized by the fact that the radial cross-section of the hollow metallic bead ring has the shape of a circle.

14. The tire according to claim 1, characterized by the fact that the radial cross-section of the hollow metallic bead ring has the shape of a square with rounded corners.

15. The tire according to claim 1, characterized by the fact that the radial cross-section of the hollow metallic bead ring has approximately the shape of an ellipse whose minor axis is substantially parallel to the interior reinforcement.

16. The tire according to claim 1, characterized by the fact that the radial cross-section of the hollow metallic bead ring has the shape of a parallelogram with rounded corners, the small diagonal of which is substantially parallel to the interior reinforcement.

17. The tire according to claim 1, characterized by the fact that the interior reinforcement is arranged along the bisector of the angle formed by the converging sides facing the rim.

18. The tire according to claim 1, characterized by the fact that the converging sides of the radial cross-section of the hollow metallic bead ring which face the rim form an angle substantially equal to the angle formed by the bead seat on the rim with the tangent to the rim flange adjacent to said bead seat.

19. The tire according to claim 1, characterized by the fact that it comprises a carcass reinforcement of radial type, preferably of metal.

20. The tire according to claim 1, characterized by the fact that the second rib is wider than the first rib.

* * * * *

UNITED STATES PATENT AND TRADEMARK OFFICE
CERTIFICATE OF CORRECTION

PATENT NO. : 4,237,954

DATED : December 9, 1980

INVENTOR(S) : JEAN POMMIER

It is certified that error appears in the above—identified patent and that said Letters Patent is hereby corrected as shown below:

```
Col. 3, line 51, "againt" should read -- against --.
Col. 6, line 26, "samll" should read -- small --.  Col. 6,
line 65; col. 7, lines 3, 6, 10 and 16; col. 8, lines 3, 7,
13 and 16; each occurrence, "claim 1" should read
-- claim 11 --.
```

Signed and Sealed this

Seventh Day of April 1981

[SEAL]

Attest:

RENE D. TEGTMEYER

*Attesting Officer*   *Acting Commissioner of Patents and Trademarks*